US012350744B2

(12) United States Patent
Segawa et al.

(10) Patent No.: US 12,350,744 B2
(45) Date of Patent: Jul. 8, 2025

(54) DRILL

(71) Applicant: SUMITOMO ELECTRIC HARDMETAL CORP., Hyogo (JP)

(72) Inventors: Mayuka Segawa, Hyogo (JP); Machiko Abe, Hyogo (JP); Akihiko Ueda, Hyogo (JP); Yoshinori Tanigawa, Hyogo (JP); Takashi Harada, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 541 days.

(21) Appl. No.: 17/636,690

(22) PCT Filed: May 22, 2020

(86) PCT No.: PCT/JP2020/020268
§ 371 (c)(1),
(2) Date: Feb. 18, 2022

(87) PCT Pub. No.: WO2021/038987
PCT Pub. Date: Mar. 4, 2021

(65) Prior Publication Data
US 2022/0288699 A1    Sep. 15, 2022

(30) Foreign Application Priority Data
Aug. 27, 2019 (JP) .................... 2019-154555

(51) Int. Cl.
*B23B 51/00* (2006.01)

(52) U.S. Cl.
CPC .......... *B23B 51/00* (2013.01); *B23B 2226/31* (2013.01); *B23B 2226/315* (2013.01);
(Continued)

(58) Field of Classification Search
CPC ......... Y10T 7408/81; Y10T 7408/9093; B23B 2226/31; B23B 2226/315;
(Continued)

(56) References Cited

U.S. PATENT DOCUMENTS 2,260,288 A * 10/1941 Black ...................... B23B 51/00
29/DIG. 26
2,370,706 A * 3/1945 Andreasson ............ B23B 51/02
408/230
(Continued)

FOREIGN PATENT DOCUMENTS

CN         204818197 U    12/2015
JP          5-009814 U1    2/1993
(Continued)

*Primary Examiner* — Ryan Rufo
(74) *Attorney, Agent, or Firm* — Renner, Otto, Boisselle & Sklar, LLP

(57) ABSTRACT

A drill includes a blade tip part that is formed of diamond and a trunk part that is formed of diamond and is continuous with the blade tip part, the drill rotating about a drill axis, the blade tip part includes N cutting edges where N is an integer of no less than 4, and a proportion of S1 to S2 is no less than 30% and no more than 60%, where S1 is an area of the drill in a cross-section with the drill axis as a normal line, the cross-section including a boundary between the blade tip part and the trunk part, r is a maximum value of a distance from the drill axis to an outer edge of the drill in the cross-section and S2 is an area of a circle with r as a radius.

4 Claims, 15 Drawing Sheets

(52) U.S. Cl.
CPC ... *B23B 2251/204* (2013.01); *B23B 2251/208* (2013.01); *B23B 2251/241* (2013.01); *B23B 2251/248* (2013.01); *Y10T 408/9093* (2015.01)

(58) Field of Classification Search
CPC ........ B23B 2251/241; B23B 2251/248; B23B 2251/24; B23B 2251/204; B23B 2251/205; B23B 2251/207; B23B 2251/208; B23B 51/00
USPC .................................................. 408/228, 145
See application file for complete search history.

(56) References Cited

U.S. PATENT DOCUMENTS

| | | | |
|---|---|---|---|
| 2,587,980 A * | 3/1952 | Doepker | B23B 51/00 408/211 |
| 4,720,218 A * | 1/1988 | DeFries | B24D 99/00 407/1 |
| 4,906,146 A | 3/1990 | Bowling | |
| 5,664,914 A * | 9/1997 | Taniguchi | B23B 51/00 408/199 |
| 7,900,721 B2 * | 3/2011 | Sian | E21B 10/58 175/420.1 |
| 9,271,740 B2 | 3/2016 | Scianamblo | |
| 2012/0183364 A1 * | 7/2012 | Harden | B22F 7/06 407/115 |
| 2014/0227034 A1 * | 8/2014 | Inglis | B23B 51/08 405/36 |
| 2020/0206830 A1 * | 7/2020 | Tanabe | B28D 1/146 |
| 2020/0340139 A1 | 10/2020 | Sumiya | |

FOREIGN PATENT DOCUMENTS

| | | |
|---|---|---|
| JP | 2002-036017 A | 2/2002 |
| JP | 2003-260612 A | 9/2003 |
| JP | 2003-326410 A | 11/2003 |
| JP | 5809344 B1 * | 11/2015 |
| JP | 2016-120551 A | 7/2016 |
| JP | 6421904 B1 | 11/2018 |

* cited by examiner

DRILL

TECHNICAL FIELD

The present disclosure relates to a drill. The present application claims priority based on Japanese Patent Application No. 2019-154555, which is a Japanese patent application filed on Aug. 27, 2019. The entire disclosure of the Japanese patent application is incorporated herein by reference.

BACKGROUND ART

Because of having extremely high hardness, diamond is used for cutting tools such as drills.

Japanese Patent Laying-Open No. 2002-36017 (PTL 1) discloses a drill including single crystal diamond at a distal end, a distal end part of the single crystal diamond including surfaces of a quadrangular pyramid.

Japanese Patent Laying-Open No. 2003-260612 (PTL 2) discloses a diamond tool including a machining part formed of diamond, the machining part being provided at a distal end of a shank, the machining part being a triangular pyramid-shape including three ridges that function as cutting edges.

CITATION LIST

Patent Literature

PTL 1: Japanese Patent Laying-Open No. 2002-36017
PTL 2: Japanese Patent Laying-Open No. 2003-260612

SUMMARY OF INVENTION

A drill of the present disclosure is a drill including a blade tip part that is formed of diamond and a trunk part that is formed of diamond and is continuous with the blade tip part, the drill rotating about a drill axis, wherein:
  the blade tip part includes N cutting edges where N is an integer of no less than 4;
  each of the N cutting edges includes a corresponding one of N ridges leading to an apex of an N-gonal pyramid, the apex being present on the drill axis; and
  a proportion of S1 to S2 is no less than 30% and no more than 60%, where S1 is an area of the drill in a cross-section with the drill axis as a normal line, the cross-section including a boundary between the blade tip part and the trunk part, r is a maximum value of a distance from the drill axis to an outer edge of the drill in the cross-section and S2 is an area of a circle with r as a radius.

DETAILED DESCRIPTION

Figure 1:
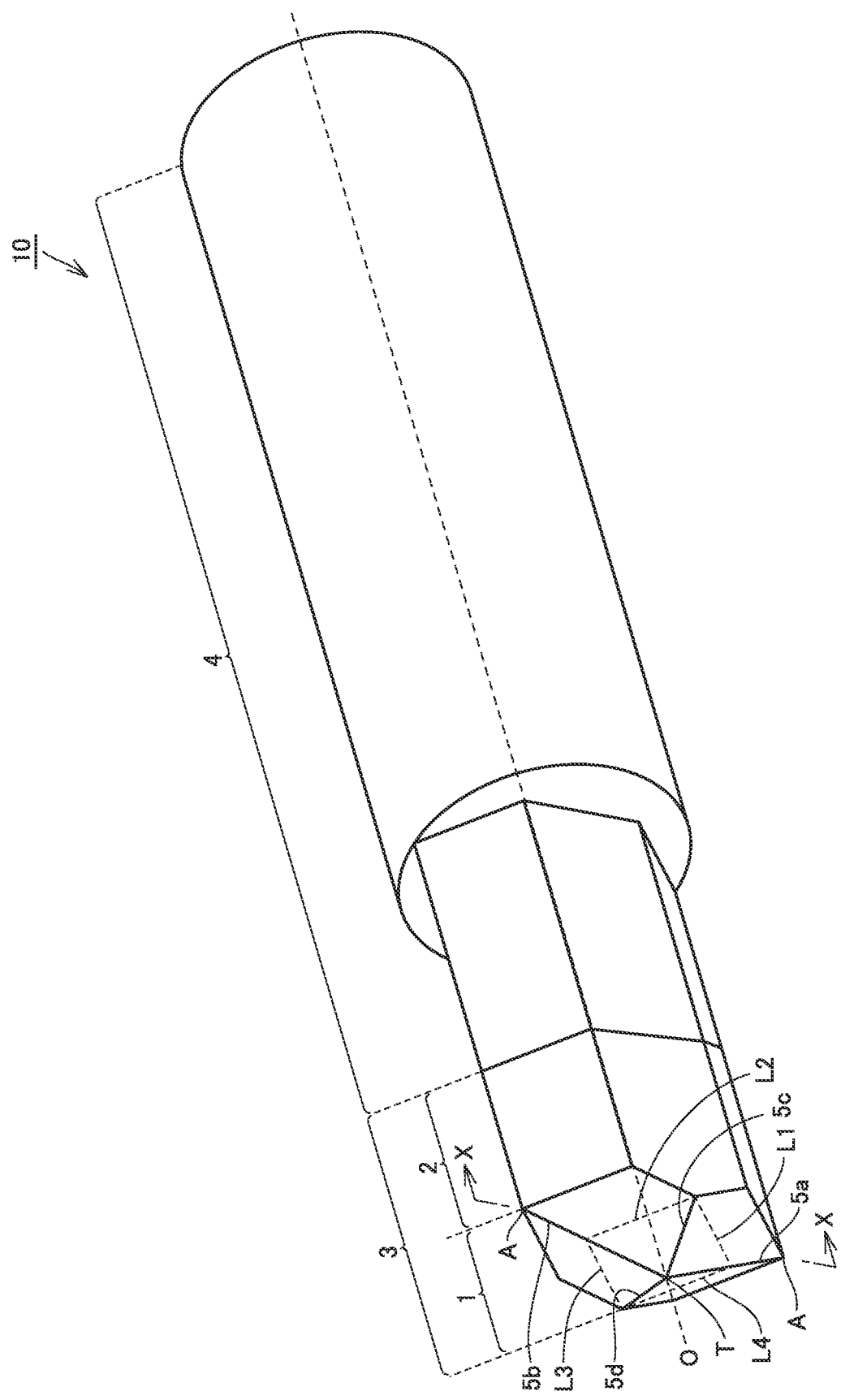
FIG. 1 is a perspective view of a drill of Embodiment 1.

Problem to be Solved by the Present Disclosure

In drilling a hole via a drill, if chips are accumulated between the drill and the drilled hole, the drill is broken, resulting in shortening of the tool life. Therefore, there is a demand for a drill having excellent chip evacuation performance and a long tool life.

Therefore, an object of the present disclosure is to provide a drill having excellent chip evacuation performance and a long tool life.

Advantageous Effect of the Present Disclosure

The drill of the present disclosure has excellent chip evacuation performance and a long tool life.

Description of Embodiments

First, a list and description of embodiments of the present disclosure will be provided.

(1) The drill of the present disclosure is a drill including a blade tip part that is formed of diamond and a trunk part that is formed of diamond and is continuous with the blade tip part, the drill rotating about a drill axis, wherein:
  the blade tip part includes N cutting edges where N is an integer of no less than 4;
  each of the N cutting edges includes a corresponding one of N ridges leading to an apex of an N-gonal pyramid, the apex being present on the drill axis; and
  a proportion of S1 to S2 is no less than 30% and no more than 60%, where S1 is an area of the drill in a cross-section with the drill axis as a normal line, the cross-section including a boundary between the blade tip part and the trunk part, r is a maximum value of a distance from the drill axis to an outer edge of the drill in the cross-section and S2 is an area of a circle with r as a radius.

The drill of the present disclosure has excellent chip evacuation performance and a long tool life.

(2) It is preferable that the proportion of S1 to S2 be no less than 45% and no more than 55%. According to the above, the chip evacuation performance of the drill is further enhanced.

(3) It is preferable that the diamond is polycrystalline diamond having an average grain diameter of no more than 100 nm and a purity of no less than 99%. According to the above, strength, hardness and heat resistance of the drill are enhanced.

(4) It is preferable that the diamond is single crystal diamond. According to the above, because of high heat conductivity, progress of abrasion of the blade tip is slow and sharpness of the edges can easily be maintained and cutting quality is enhanced.

Details of Embodiments

Specific examples of the drill of the present disclosure will be described below with reference to the drawings. In the drawings of the present disclosure, same reference signs represent parts that are identical or correspond to each other. Also, the dimensional relationships in length, width, thickness, depth, etc., are ones arbitrarily changed for clarity and simplicity of the drawings and do not necessarily represent actual dimensional relationships.

Figure 19:
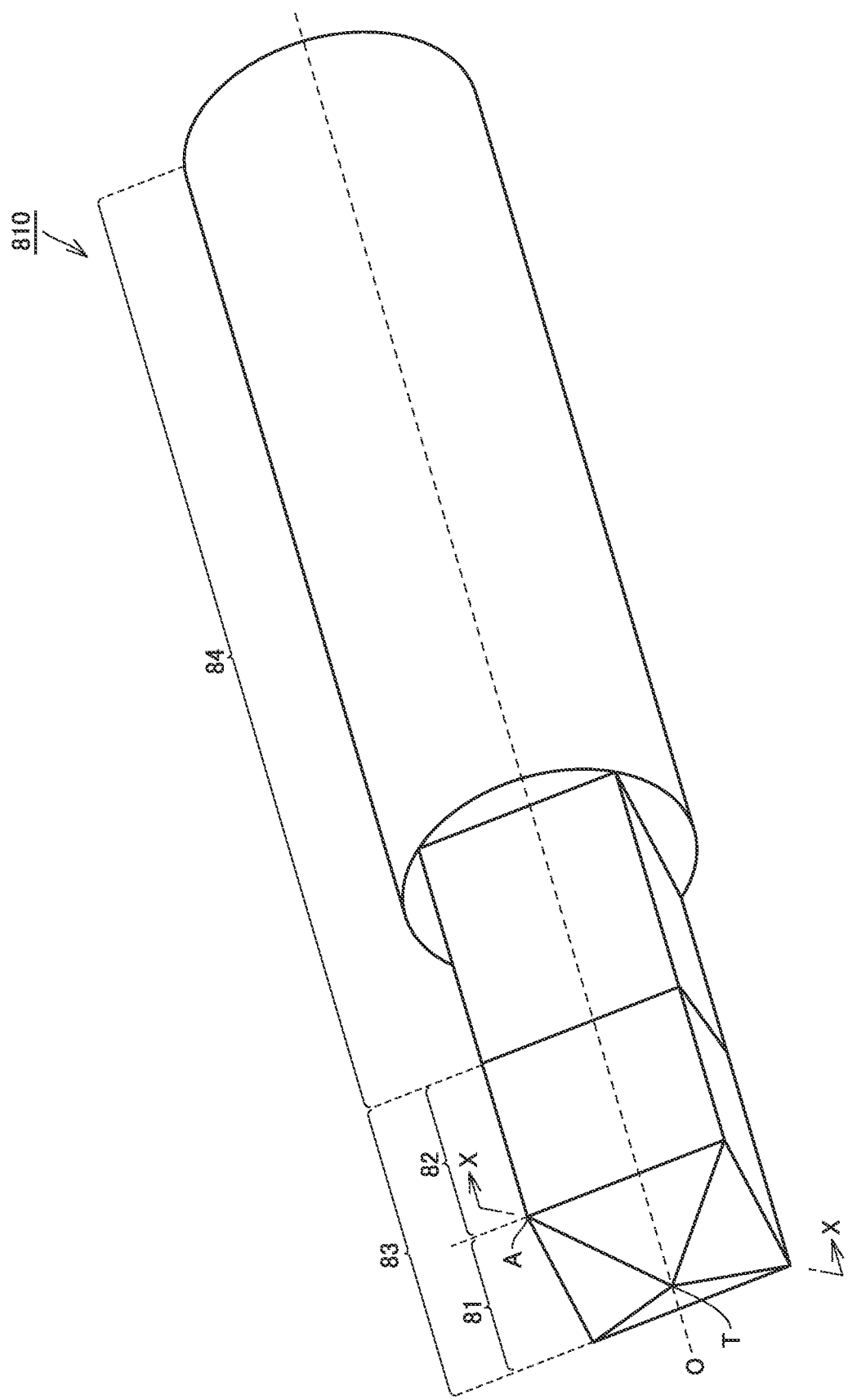
FIG. 19 is a perspective view of an example of a conventional drill using diamond for a blade tip part.
Figure 20:
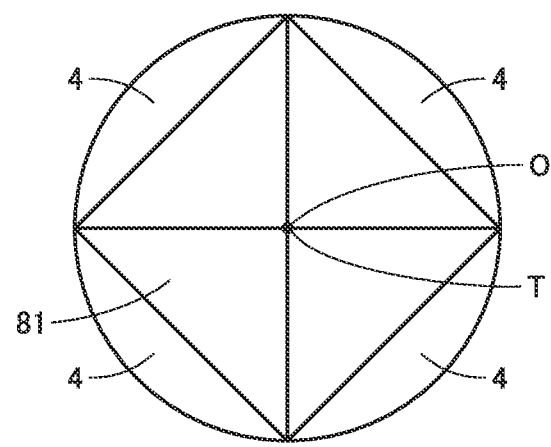
FIG. 20 is a plan view of the drill in FIG. 19 from the apex side of a blade tip part.
Figure 21:
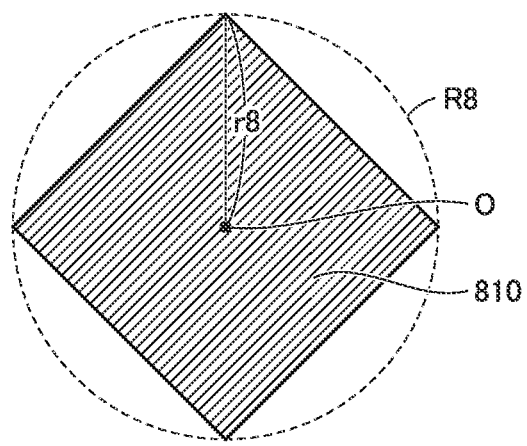
FIG. 21 is a cross-sectional view of the drill in FIG. 19 along line X-X.

For a help in understanding the drill of the present disclosure, first, a drill using diamond for a conventional blade tip part will be described in successive comparison with the present disclosure in terms of function. FIG. 19 is a perspective view illustrating an example of a conventional drill 810 using diamond for a blade tip part 81. FIG. 20 is a plan view of drill 810 in FIG. 19 from the apex T side of blade tip part 81. FIG. 21 is a cross-sectional view of drill 810 in FIG. 19 along line X-X.

Because of having high hardness, diamond has a restriction on a machined shape thereof. Therefore, as illustrated in FIGS. 19 and 20, in a conventional drill, for a shape of blade tip part 81, a shape that can easily be provided by machining, such as a square pyramid, is employed. However, the shape of the conventional drill causes accumulation of chips in a gap between the drill and a drilled hole, which may cause breakage of the drill, resulting in shortening of the tool life.

In view of the above circumstances, as a result of a diligent study, the present inventors have created a new drill shape, the shape enabling a blade tip part formed of diamond to be easily fabricated and providing excellent chip evacuation performance and thus have completed the present disclosure.

The drill of the present disclosure is a drill including a blade tip part formed of diamond and a trunk part that is formed of diamond and is continuous with the blade tip part, the drill rotating about a drill axis, wherein: the blade tip part include N cutting edges where N is an integer of no less than 4; each of the N cutting edges includes a corresponding one of N ridges leading to an apex of an N-gonal pyramid, the apex being present on the drill axis; and a proportion of S1 to S2 is no less than 30% and no more than 60%, where S1 is an area of the drill in a cross-section with the drill axis as a normal line, the cross-section including a boundary between the blade tip part and the trunk part, r is a maximum value of a distance from the drill axis to an outer edge of the drill in the cross-section and S2 is an area of a circle with r as a radius.

The drill of the present disclosure includes a blade tip part formed of diamond, the blade tip part includes N cutting edges where N is an integer of no less than 4, and each of the N cutting edges include a corresponding one of N ridges leading to an apex of an N-gonal pyramid, the apex being present on a drill axis. Such blade tip part includes surfaces of the N-gonal pyramid.

The surfaces of the N-gonal pyramid can be formed by cutting an object along planes. Therefore, the blade tip part including the surfaces of the N-gonal pyramid has a shape that can easily be formed by machining diamond.

Furthermore, in the drill of the present disclosure, a proportion of S1 to S2 is no less than 30% and no more than 60%, where S1 is an area of the drill in a cross-section with the drill axis as a normal line, the cross-section including a boundary between the blade tip part and a trunk part, r is a maximum value of a distance from the drill axis to an outer edge of the drill in the cross-section and S2 is an area of a circle with r as a radius. S1 corresponds to the area of a part of the drill, the part contributing to formation of a drilled hole, in the cross-section with the drill axis as a normal line. S2 corresponds to the area of the drilled hole drilled by the drill in the cross-section with the drill axis as a normal line.

As the proportion of S1 to S2 is smaller, a gap between the drilled hole and the drill is larger, which enhances chip evacuation performance. For example, in a conventional drill including a blade tip part formed as a square pyramid, such as illustrated in FIGS. 19 to 21, a proportion of S1 (cross-sectional area of drill 810, which is indicated by shading in FIG. 21) to S2 (area of a circle R8 in FIG. 21) is approximately 64%. On the other hand, in the drill of the present disclosure, the proportion of S1 to S2 is no less than 30% and no more than 60% and thus, the chip evacuation performance is enhanced in comparison with the conventional drill.

From the perspective of ensuring strength of the drill, a lower limit of the proportion of S1 to S2 is 30%. The proportion of S1 to S2 is preferably no less than 45% and no more than 55%.

In the drill of the present disclosure, the diamond forming the blade tip part is not specifically limited and either natural diamond or synthetic diamond can be used. For synthetic diamond, either polycrystalline diamond or single crystal diamond can be used.

For the diamond, it is preferable to use polycrystalline diamond. According to the above, the drill can have sufficient strength, hardness and heat resistance.

It is preferable that the diamond is polycrystalline diamond having an average grain diameter of no more than 100 nm and a purity of no less than 99%. According to the above, the strength, hardness and heat resistance of the drill is further enhanced.

A lower limit of the average grain diameter of the polycrystalline diamond does not need to be specifically determined, but from the perspective of manufacture, can be determined as 10 nm. The average grain diameter of the polycrystalline diamond is preferably no less than 10 nm and no more than 100 nm, more preferably no less than 10 nm and no more than 30 nm.

The average grain diameter of the polycrystalline diamond in the present description is measured via a cutting method using a scanning electron microscope. A specific measurement method will be described below.

First, a surface of the polycrystalline diamond is mirror-polished and the polished surface of the polycrystalline diamond is observed with 30000 magnification using a scanning electron microscope (SEM) and an SEM image is obtained.

Next, a circle is drawn on the SEM image and eight straight lines are drawn radially (in such a manner that angles of intersection between the respective straight lines are substantially equal to one another) from a center of the circle to an outer circumference of the circle. In this case, a diameter of the circle is set in such a manner that the number of diamond grains on each of the above straight lines is around 10 to 50.

Subsequently, for each of the above straight lines, the number of parts in which the straight line extend through a crystal grain boundary between diamond grains is counted and an average segment length is calculated by dividing a length of the straight line by the number of parts. A numerical value obtained by multiplying the average segment length by 1.128 is determined as an average grain diameter of the polycrystalline diamond in the SEM image.

Using three SEM images obtained by shooting images of different parts of one sample, an average grain diameter of polycrystalline diamond is calculated for each SEM image according to the above-described method. An average value of the obtained three polycrystalline diamond average grain diameters is determined as an average grain diameter of the polycrystalline diamond in the present description.

A purity of the diamond is preferably no less than 99%, more preferably no less than 99% and no more than 100%, still more preferably no less than 99.99% and no more than 100%. The purity of the diamond can be measured via SIMS (secondary ion mass spectrometry) analysis or an X-ray diffraction pattern of the polycrystalline diamond.

A method for manufacturing the polycrystalline diamond is not specifically limited. For example, polycrystalline diamond obtained by sintering a carbon material of a graphite-type layered structure under ultra-high temperature and pressure with neither sintering agent nor catalyst added can be used.

It is preferable that the diamond is single crystal diamond. According to the above, because of high heat conductivity, progress of abrasion of the blade tip is slow and sharpness of edges can easily be maintained and cutting quality is enhanced.

Examples of the single crystal diamond include natural diamond and synthetic single crystal diamond. A method for manufacturing the synthetic single crystal diamond is not specifically limited. For example, synthetic single crystal diamond fabricated using high-pressure synthesis or vapor-phase synthesis can be used.

The drill of the present disclosure will more specifically be described in Embodiments 1 to 7 below.

Embodiment 1

Figure 2:
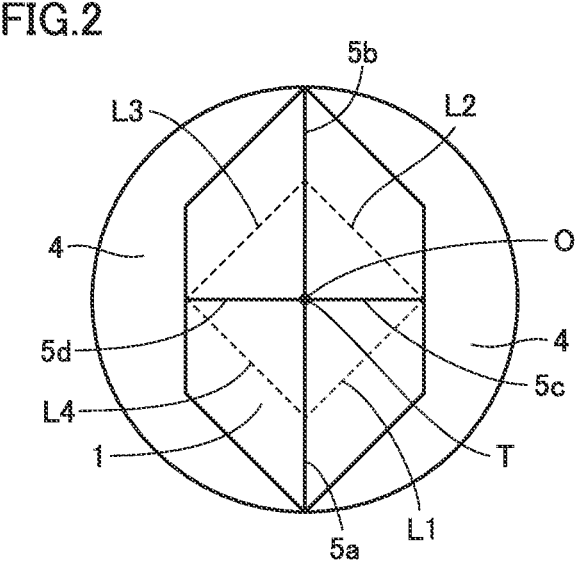
FIG. 2 is a plan view of the drill in FIG. 1 from the apex side of a blade tip part.
Figure 3:
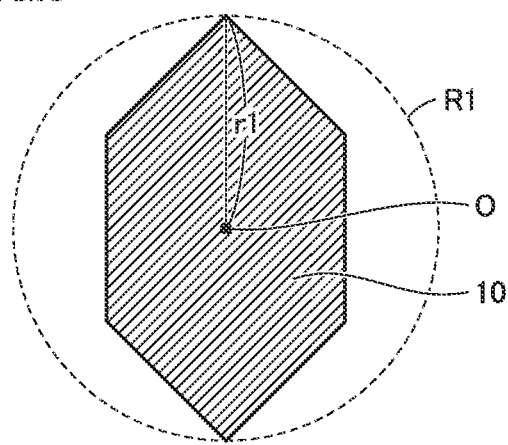
FIG. 3 is a cross-sectional view of the drill in FIG. 1 along line X-X.

FIG. 1 is a perspective view of a drill of Embodiment 1, FIG. 2 is a plan view of the drill in FIG. 1 from the apex T side of a blade tip part. FIG. 3 is a cross-sectional view of the drill in FIG. 1 along line X-X.

A drill 10 of Embodiment 1 includes a blade tip part 1 formed of diamond, and a trunk part 2 connected to blade tip part 1 and formed of diamond, and rotates about a drill axis O. In the present description, a blade tip part refers to a part of a drill, the part including cutting edges. A boundary between the blade tip part and a trunk part is located in a cross-section with a drill axis as a normal line, the cross-section extending through an end part A on the trunk part side of a longest cutting edge of cutting edges.

Blade tip part 1 and trunk part 2 form a body part 3. Drill 10 can include a connection part 4 to be connected to body part 3 in order to connect drill 10 to a holding tool (not illustrated).

Blade tip part 1 includes four cutting edges 5a, 5b, 5c, 5d. Cutting edges 5a, and 5b have a same length and cutting edges 5c and 5d have a same length. Cutting edges 5a, 5b are longer than cutting edges 5c, 5d.

Each of four cutting edges 5a, 5b, 5c, 5d includes a corresponding one of four ridges of a square pyramid including an apex T present on drill axis O. In FIGS. 1 and 2, the square pyramid is illustrated as a square pyramid with apex T of blade tip part 1 as an apex thereof and a square shape surrounded by dotted lines L1, L2, L3, L4 as a bottom surface thereof.

In drill 10, a proportion of S1 to S2 is no less than 30% and no more than 60%, where S1 is an area of drill 10 in a cross-section with drill axis O as a normal line, the cross-section including a boundary between blade tip part 1 and trunk part 2 (section along line X-X in FIG. 1), r1 is a maximum value of a distance from drill axis O to an outer edge of drill 10 in the cross-section and S2 is an area of a circle R1 having r1 as a radius.

Comparison between FIG. 3 (Embodiment 1) and FIG. 21 (conventional drill) shows that the proportion of S1 (cross-sectional area of drill 10) to S2 (area of circle R1) in the drill of Embodiment 1 is smaller than that of the conventional drill. Therefore, in a case where respective drilled holes are the same in size, the drill of Embodiment 1 provides a larger gap between the drill and the drilled hole than that of the conventional drill and thus has enhanced chip evacuation performance. The drill prevents occurrence of a defect in the drill due to accumulation of chips in the gap and thus can have a long life.

Trunk part 2 can have a hexagonal prism shape including a bottom surface having a shape of drill 10 (hexagonal shape) in the cross-section with drill axis O as a normal line, the cross-section including the boundary between the blade tip part and the trunk part (cross-section in line X-X in FIG. 1).

Although the above description has been provided in terms of a case where the drill includes a blade tip part including four cutting edges and each of the four cutting edges includes a corresponding one of four ridges leading to an apex of a square pyramid, the apex being present on a drill axis, the shape of the drill is not limited to this case. For example, the drill can have a form in which a number N of cutting edges included in a blade tip part is an integer of no less than 4 and each of the N cutting edges includes a corresponding one of N ridges leading to an apex of a regular N-gonal pyramid, the apex being present on a drill axis. In particular, from the perspective of a shape of a drilled hole, it is preferable that N be an even number of no less than 4. An upper limit of N is not specifically determined, but can be determined as, for example 10. In other words, N can be an integer of no less than 4 and no more than 10 and is preferably an even number of no less than 4 and no more than 10.

In Embodiment 1, the entirety of the blade tip part can be formed in a shape resulting from each of two or more apexes of a plurality of apexes of a bottom surface of a regular N-gonal pyramid shape being cut off along a plane perpendicular to the bottom surface.

When each of the apexes is cut off, it is preferable to cut off the apex along a plane perpendicular to the bottom surface in such a manner that a shape of the drill in a cross-section with the drill axis as a normal line, the cross-section including a boundary between the blade tip part and the trunk part is a line-symmetric shape and/or a point-symmetric shape and the proportion of S1 to S2 is no less than 30% and no more than 60%. Consequently, the resulting drill provides a sufficiently large gap between the drill and a drilled hole and thus has enhanced chip evacuation performance. The drill prevents occurrence of a defect in the drill due to accumulation of chips in the gap and thus can have a long life.

Embodiment 2

Figure 4:
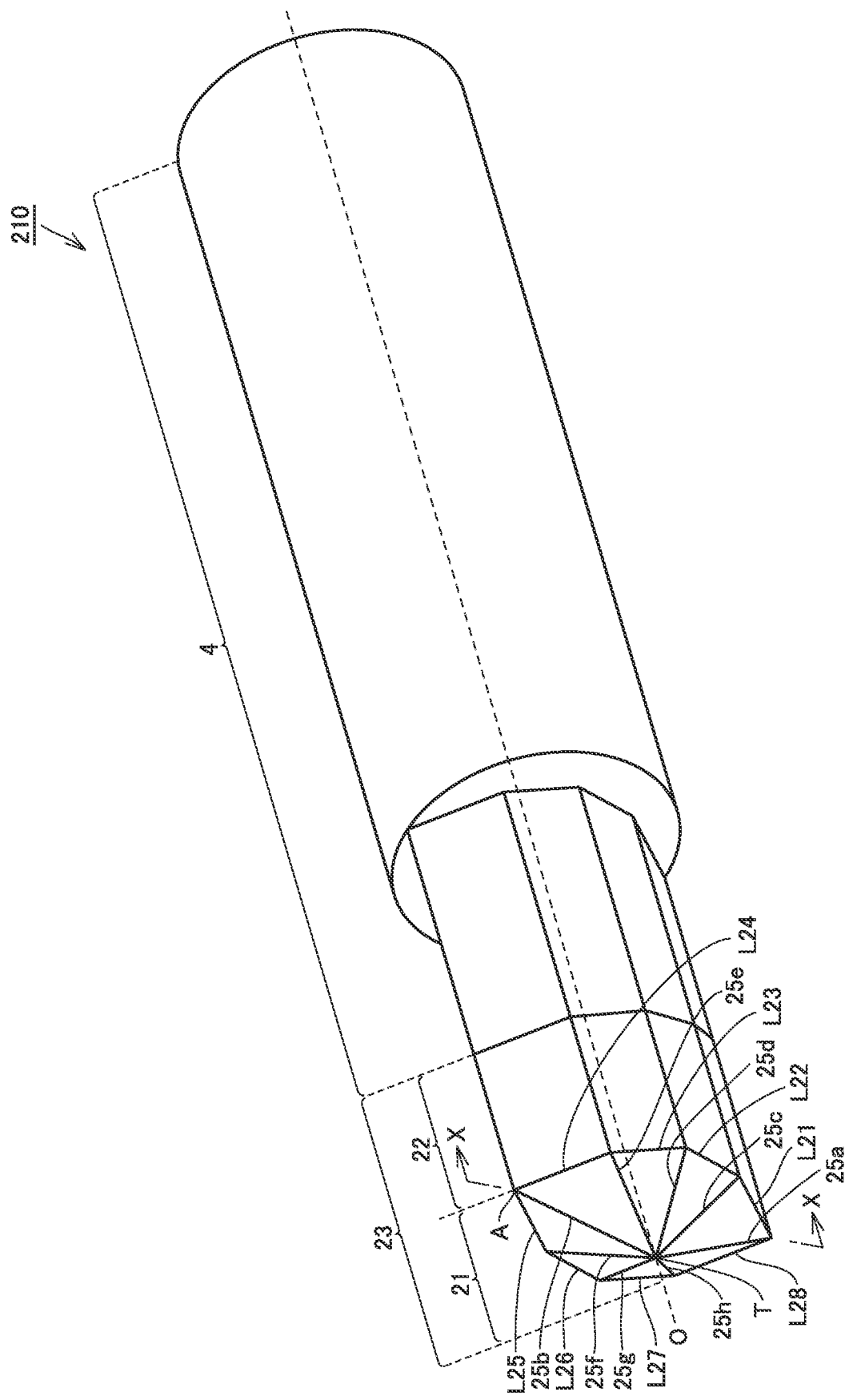
FIG. 4 is a perspective view of a drill of Embodiment 2.
Figure 5:
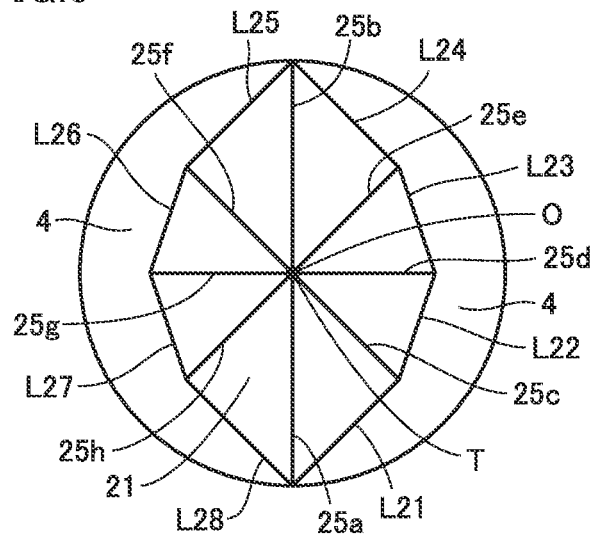
FIG. 5 is a plan view of the drill in FIG. 4 from the apex side of a blade tip part.
Figure 6:
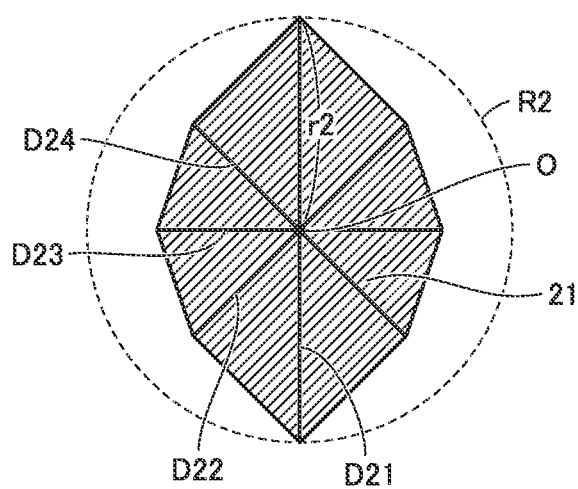
FIG. 6 is a cross-sectional view of the drill in FIG. 4 along line X-X.

FIG. 4 is a perspective view of a drill of Embodiment 2. FIG. 5 is a plan view of the drill in FIG. 4 from the apex T side of a blade tip part. FIG. 6 is a cross-sectional view of the drill in FIG. 4 along line X-X.

A drill 210 of Embodiment 2 can have a configuration that is similar to that of the drill of Embodiment 1 except for shapes of a blade tip part 21 and a trunk part 22. Therefore, Embodiment 2 will be described in terms of the shapes of blade tip part 21 and trunk part 22.

Blade tip part 21 includes eight cutting edges 25a, 25b, 25c, 25d, 25e, 25f, 25g, 25h. Two cutting edges 25a, 25b of the eight cutting edges have a same length and are longer than the other cutting edges 25c, 25d, 25e, 25f, 25g, 25h.

Each of eight cutting edges 25a, 25b, 25c, 25d, 25e, 25f, 25g, 25h includes a corresponding one of eight ridges of an octagonal pyramid including an apex T present on a drill axis O. In FIGS. 4 and 5, the octagonal pyramid is illustrated as an octagonal pyramid with apex T of blade tip part 21 as an apex thereof and an octagonal shape surrounded by solid lines L21, L22, L23, L24, L25, L26, L27, L28 as a bottom surface thereof.

In the present embodiment, each of cutting edges 25a, 25b, 25c, 25d, 25e, 25f, 25g, 25h of the blade tip part and the corresponding one of the eight ridges of the octagonal pyramid coincide in length with each other. In other words, blade tip part 21 has an octagonal pyramid shape. A bottom surface of the octagonal pyramid has a line-symmetric and point-symmetric octagonal shape. As illustrated in FIG. 6, in the octagonal shape of the bottom surface, from among four diagonal lines D21, D22, D23, D24 extending through drill axis O, one diagonal line D21 is longest and other three diagonal lines D22, D23, D24 are shorter than diagonal line D21.

In drill 210, a proportion of S1 to S2 is no less than 30% and no more than 60%, where S1 is an area of drill 210 in a cross-section with drill axis O as a normal line, the cross-section including a boundary between blade tip part 21 and trunk part 22 (cross-section along line X-X in FIG. 4), r2 is a maximum value of a distance from drill axis O to an outer edge of drill 210 in the cross-section and S2 is an area of a circle R2 with r2 as a radius.

Comparison between FIG. 6 (Embodiment 2) and FIG. 21 (conventional drill) shows that the proportion of S1 to S2 in the drill of Embodiment 2 is smaller than that of the conventional drill. Therefore, in a case where respective drilled holes are the same in size, the drill of Embodiment 2 provides a larger gap between the drill and a drilled hole than that of the conventional drill and thus has enhanced chip evacuation performance. The drill prevents occurrence of a defect in the drill due to accumulation of chips in the gap and thus can have a long life.

Trunk part 22 can have an octagonal prism shape including a bottom surface having a shape of drill 210 in the cross-section with drill axis O as a normal line, the cross-section including the boundary between the blade tip part and the trunk part (cross-section along line X-X in FIG. 4) (octagonal shape).

Figure 7:
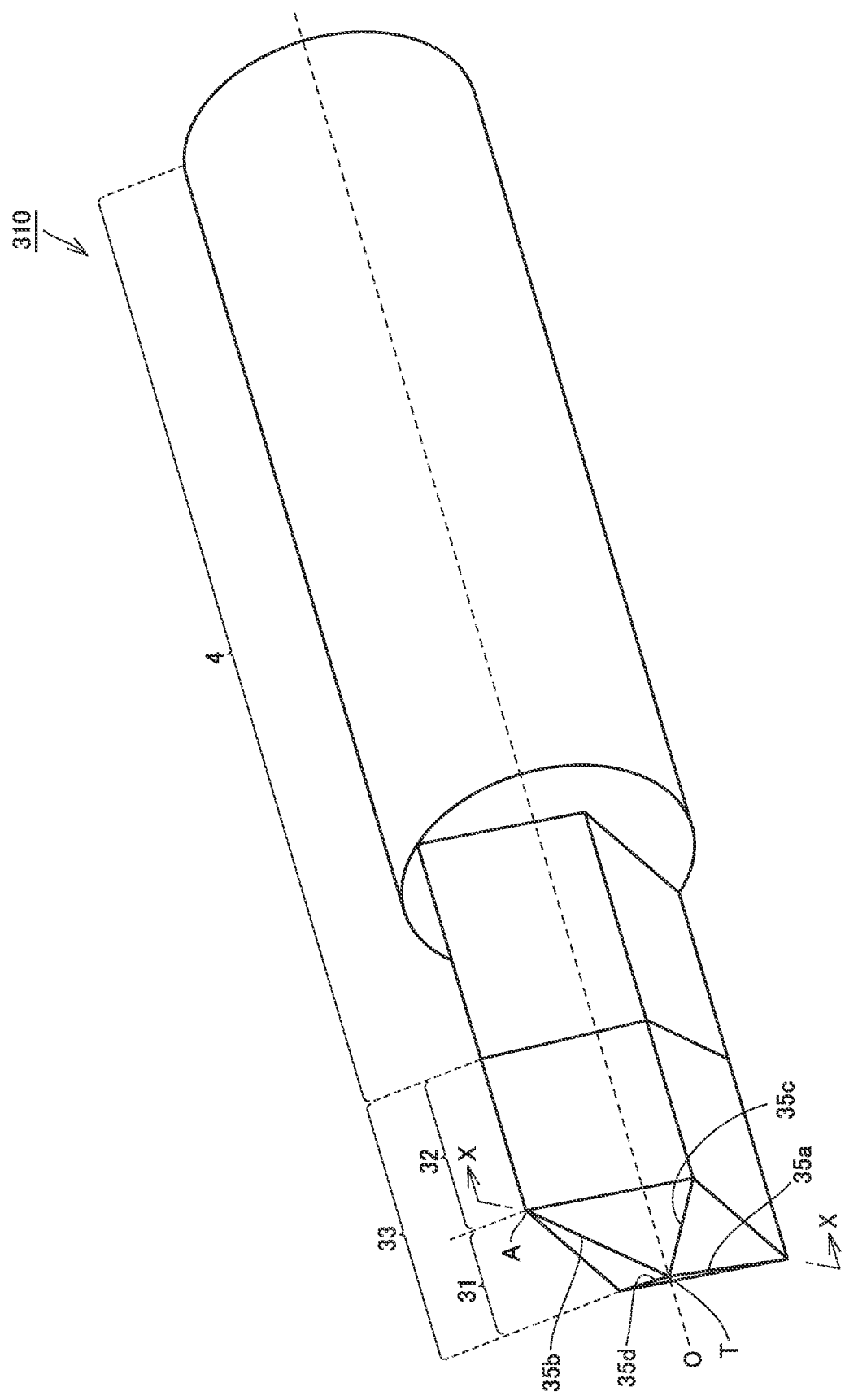
FIG. 7 is a perspective view of another example of the drill of Embodiment 2.
Figure 8:
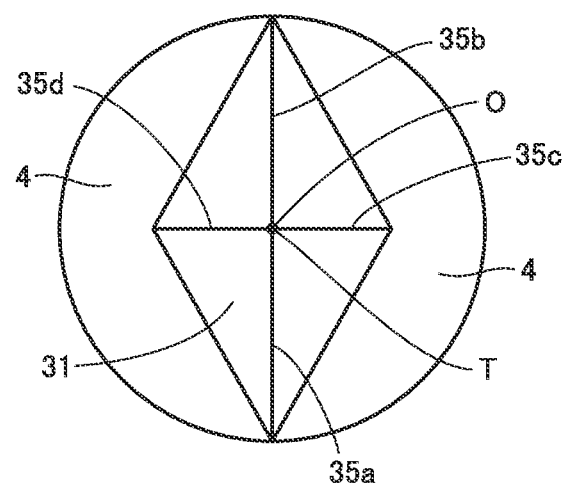
FIG. 8 is a plan view of the drill in FIG. 7 from the apex side of a blade tip part.
Figure 9:
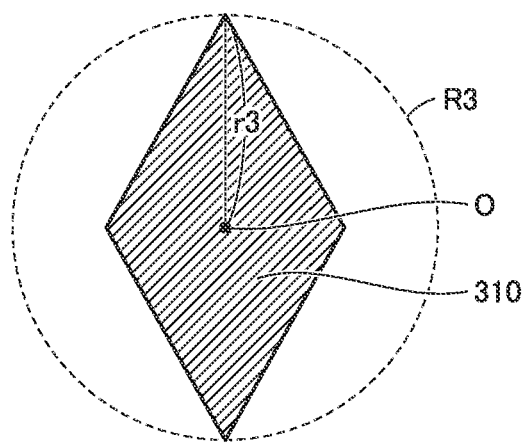
FIG. 9 is a cross-sectional view of the drill in FIG. 7 along line X-X.

Although the above description has been provided in terms of a case where the drill includes a blade tip part including eight cutting edges and each of the eight cutting edges includes a corresponding one of eight ridges leading to an apex of an octagonal pyramid, the apex being present on a drill axis, the shape of the drill is not limited to this case. For example, the drill can have a form in which a number N of cutting edges included in a blade tip part is an integer of no less than 4 and each of the N cutting edges includes a corresponding one of N ridges leading to an apex of an N-gonal pyramid, the apex being present on a drill axis. In particular, from the perspective of a shape of a drilled hole, it is preferable that N be an even number of no less than 4. If N is an even number of no less than 4, it is preferable that an N-angle shape of a bottom surface be a line-symmetric and point-symmetric shape and (N/2) diagonal lines extending through drill axis O include diagonal lines having different lengths. For reference, FIGS. 7 to 9 illustrate a drill 310 where N is 4. An upper limit of N is not specifically determined, but can be determined as, for example, 10. In other words, N can be an integer of no less than 4 and no more than 10 and is preferably an even number of no less than 4 and no more than 10.

Embodiment 3

Figure 10:
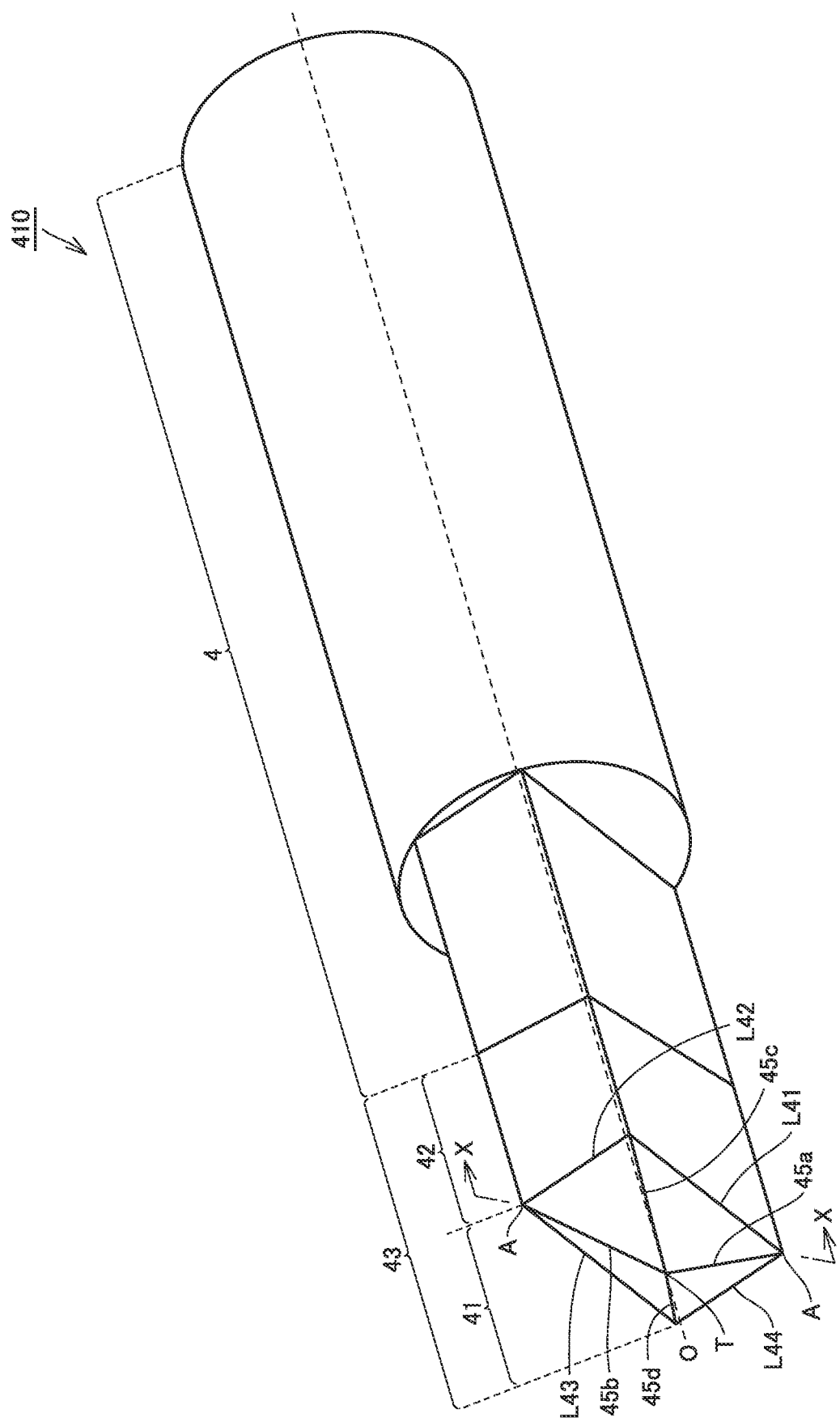
FIG. 10 is a perspective view of a drill of Embodiment 3.
Figure 11:
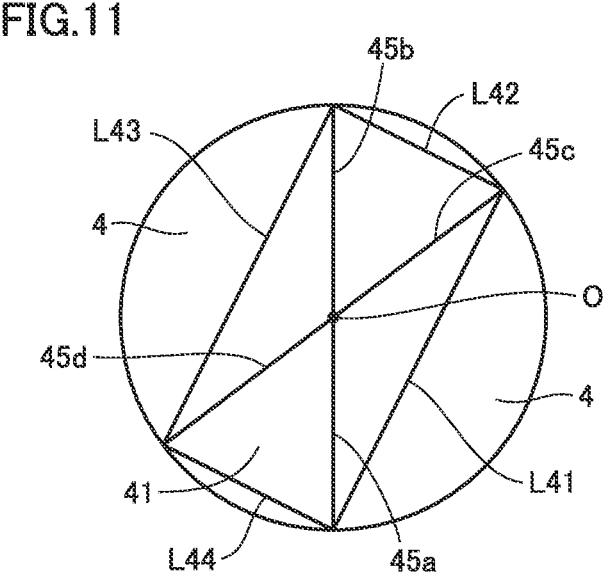
FIG. 11 is a plan view of the drill in FIG. 10 from the apex side of a blade tip part.
Figure 12:
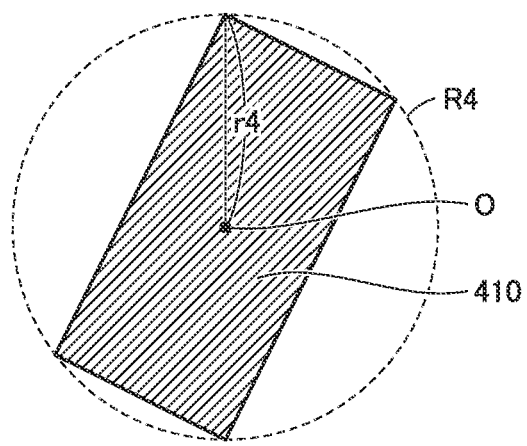
FIG. 12 is a cross-sectional view of the drill in FIG. 10 along line X-X.

FIG. 10 is a perspective view of a drill of Embodiment 3. FIG. 11 is a plan view of the drill in FIG. 10 from the apex T side of a blade tip part. FIG. 12 is a cross-sectional view of the drill in FIG. 10 along line X-X.

A drill 410 of Embodiment 3 can have a configuration that is similar to that of the drill of Embodiment 1 except for shapes of a blade tip part 41 and a trunk part 42. Therefore, Embodiment 3 will be described in terms of the shapes of blade tip part 41 and trunk part 42.

Blade tip part 41 includes four cutting edges 45a, 45b, 45c, 45d. The four cutting edges all have a same length.

Each of four cutting edges 45a, 45b, 45c, 45d includes a corresponding one of four ridges of a quadrangular pyramid including an apex T present on a drill axis O. In FIGS. 10 and 11, the quadrangular pyramid is illustrated as a quadrangular pyramid with apex T of blade tip part 41 as an apex thereof and a rectangular shape surrounded by solid lines L41, L42, L43, L44 as a bottom surface.

In the present embodiment, each of cutting edges 45a, 45b, 45c, 45d of the blade tip part and the corresponding one of the four ridges of quadrangular pyramid coincide in length with each other. In other words, blade tip part 41 has a quadrangular pyramid shape. A bottom surface of the quadrangular pyramid has a rectangular shape.

In drill 410, a proportion of S1 to S2 is no less than 30% and no more than 60%, where S1 is an area of drill 410 in a cross-section with drill axis O as a normal line, the cross-section including a boundary between the blade tip part and the trunk part (cross-section along line X-X in FIG. 10), r4 is a maximum value of a distance from drill axis O to an outer edge of drill 410 in the cross-section and S2 is an area of a circle R4 with r4 as a radius.

Comparison between FIG. 12 (Embodiment 3) and FIG. 21 (conventional drill) shows that the proportion of S1 to S2 in the drill of Embodiment 3 is smaller than that of the conventional drill. Therefore, in a case where respective drilled holes are the same in size, the drill of Embodiment 3 provides a larger gap between the drill and a drilled hole than that of the conventional drill and thus has enhanced chip evacuation performance. The drill prevents occurrence of a defect in the drill due to accumulation of chips in the gap and thus can have a long life.

Trunk part 42 can have a rectangular prism shape including a bottom surface having a shape of drill 410 in the cross-section with drill axis O as a normal line, the cross-section including the boundary between the blade tip part and the trunk part (cross-section along line X-X in FIG. 10) (rectangular shape).

Embodiment 4

Figure 13:
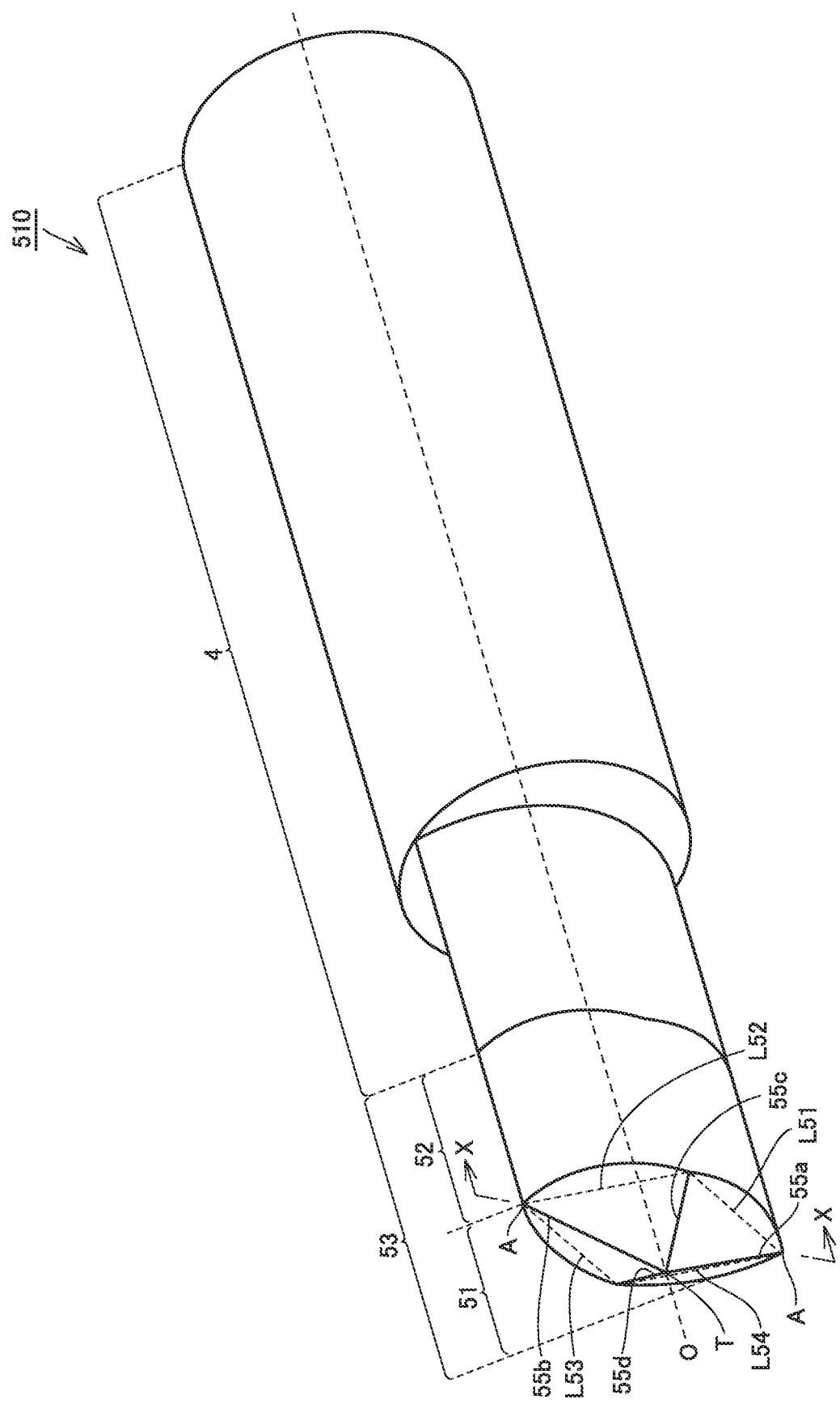
FIG. 13 is a perspective view of a drill of Embodiment 4.
Figure 14:
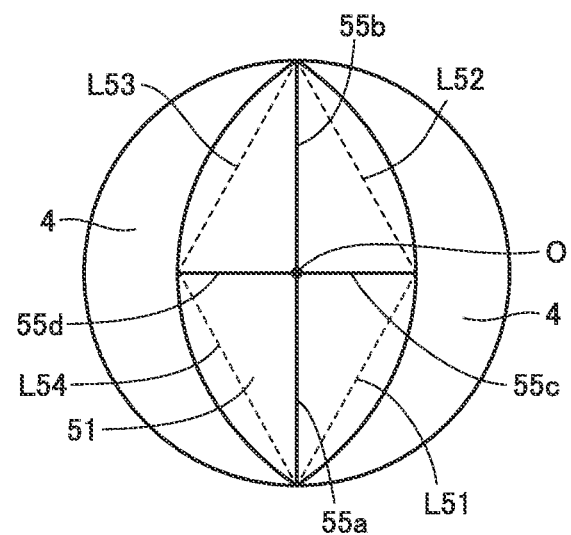
FIG. 14 is a plan view of the drill in FIG. 13 from the apex side of a blade tip part.
Figure 15:
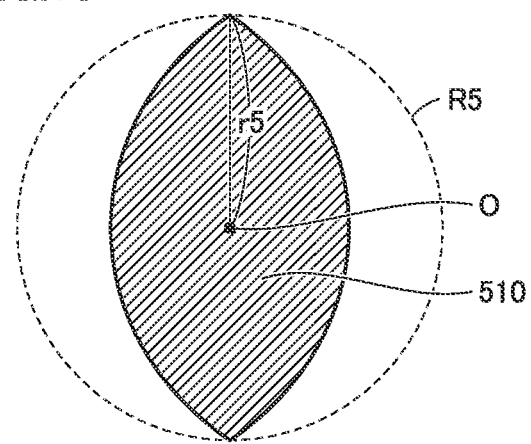
FIG. 15 is a cross-sectional view of the drill in FIG. 13 along lime X-X.

FIG. 13 is a perspective view of a drill of Embodiment 4. FIG. 14 is a plan view of the drill in FIG. 13 from the apex T side of a blade tip part. FIG. 15 is a cross-section view of the drill in FIG. 13 along line X-X.

A drill 510 of Embodiment 4 can have a configuration that is similar to that of the drill of Embodiment 1 except for shapes of a blade tip part 51 and a trunk part 52. Therefore, Embodiment 4 will be described in terms of the shapes of the blade tip part and the trunk part.

Blade tip part 51 includes four cutting edges 55*a*, 55*b*, 55*c*, 55*d*. Cutting edges 55*a* and 55*b* have a same length and cutting edges 55*c* and 55*d* have a same length. Cutting edges 55*a*, 55*b* are longer than cutting edges 55*c*, 55*d*.

Each of four cutting edges 55*a*, 55*b*, 55*c*, 55*d* includes a corresponding one of four ridges of a square pyramid including an apex T present on a drill axis O. In FIGS. 13 and 14, the square pyramid is illustrated as a quadrangular pyramid with apex T of blade tip part 51 as an apex thereof and a rhombus shape surrounded by dotted lines L51, L52, L53, L54 as a bottom surface thereof.

In drill 510, a proportion of S1 to S2 is no less than 30% and no more than 60%, where S1 is an area of drill 510 in a cross-section with drill axis O as a normal line, the cross-section including a boundary between the blade tip part and the trunk part (cross-section in line X-X in FIG. 13), r5 is a maximum value of a distance from drill axis O to an outer edge of drill 510 in the cross-section and S2 is an area of a circle R5 with r5 as a radius.

Comparison between FIG. 15 (Embodiment 4) and FIG. 21 (conventional drill) shows that the proportion of S1 to S2 in the drill of Embodiment 4 is smaller than that of the conventional drill. Therefore, in a case where respective drilled holes are the same in size, the drill of Embodiment 4 provides a larger gap between the drill and the drilled hole than that of the conventional drill and thus has enhanced chip evacuation performance. The drill prevents occurrence of a defect in the drill due to accumulation of chips in the gap and thus can have a long life.

Trunk part 52 can have a columnar shape including a bottom surface having a shape of drill 510 (shape surrounded by two arcs in plan view) in the cross-section with drill axis O as a normal line, the cross-section including the boundary between the blade tip part and the trunk part (cross-section along line X-X in FIG. 13).

Embodiment 5

Figure 16:
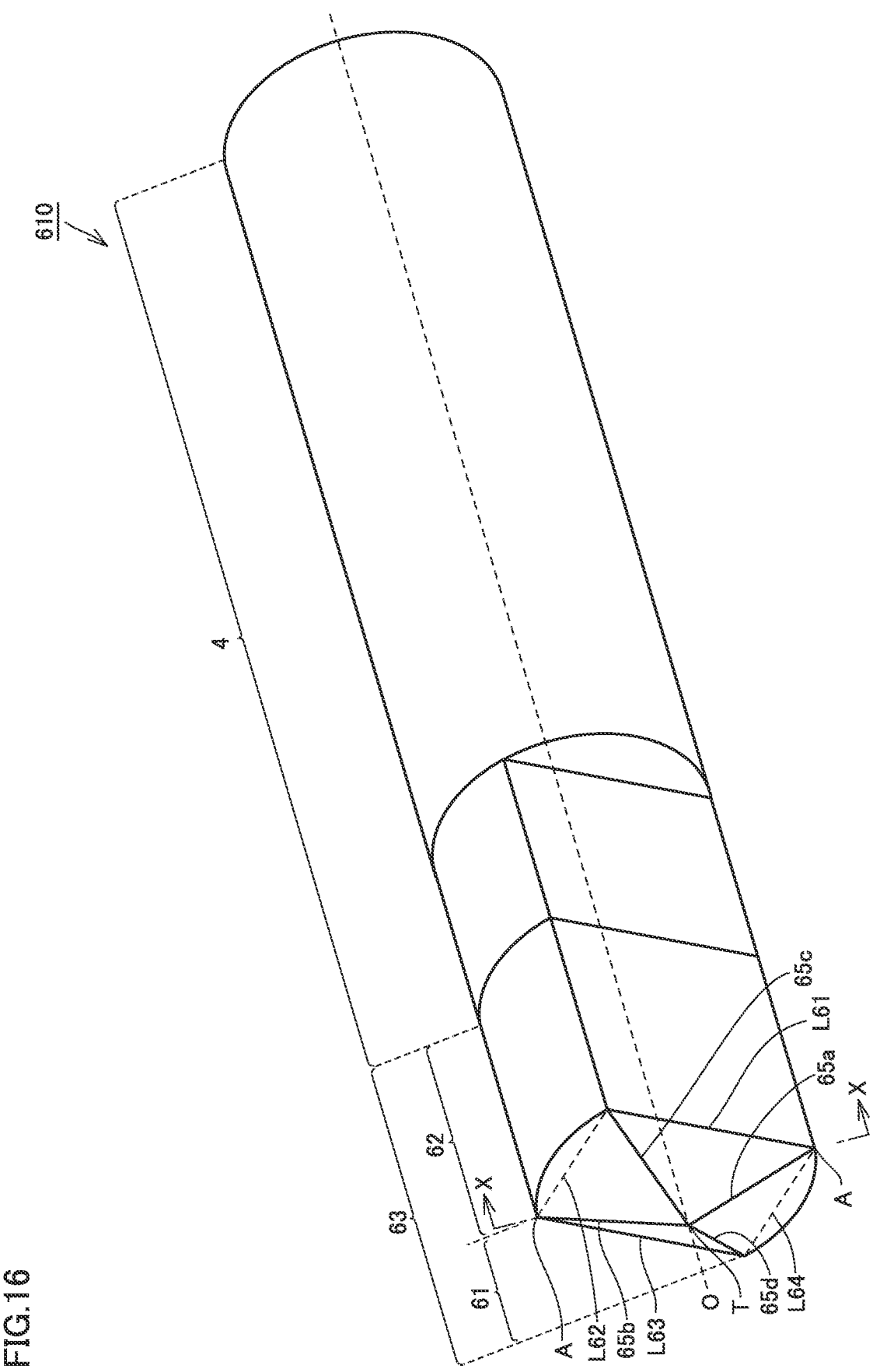
FIG. 16 is a perspective view of a drill of Embodiment 5.
Figure 17:
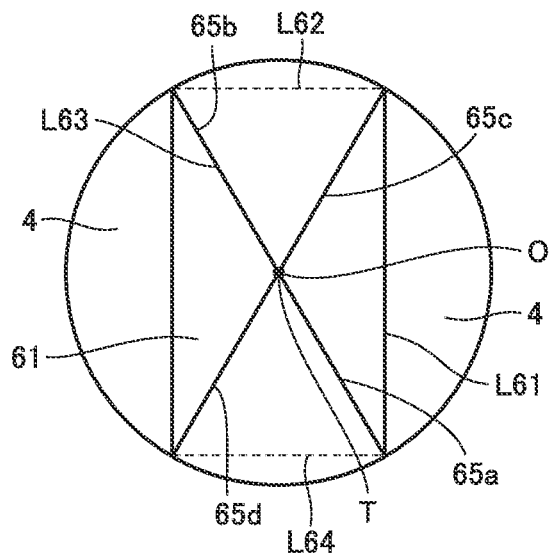
FIG. 17 is a plan view of the drill m FIG. 16 from the apex side of a blade tip part.
Figure 18:
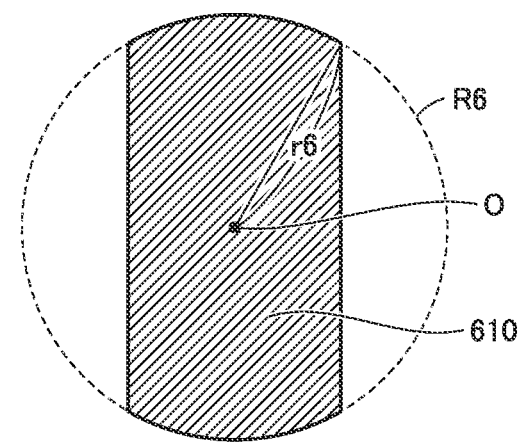
FIG. 18 is a cross-sectional view of the drill in FIG. 16 along line X-X.

FIG. 16 is a perspective view of a drill of Embodiment 5. FIG. 17 is a plan view of the drill in FIG. 16 from the apex T side of a blade tip part. FIG. 18 is a cross-sectional view of the drill in FIG. 16 along line X-X.

A drill 610 of Embodiment 5 can have a configuration that is similar to that of the drill of Embodiment 1 except for shapes of a blade tip part 61 and a trunk part 62. Therefore, Embodiment 5 will be described in terms of the shapes of blade tip part 61 and trunk part 62.

Blade tip part 61 includes four cutting edges 65*a*, 65*b*, 65*c*, 65*d*. The four cutting edges all have a same length.

Each of four cutting edges 65*a*, 65*b*, 65*c*, 65*d* includes a corresponding one of four ridges of a quadrangular pyramid including an apex T present on a drill axis O. In FIGS. 16 and 17, the quadrangular pyramid is illustrated as a quadrangular pyramid with apex T of blade tip part 61 as an apex thereof and a rectangular shape surrounded by solid lines L61, L63 and dotted lines L62, L64 as a bottom surface thereof.

In drill 610, a proportion of S1 to S2 is no less than 30% and no more than 60%, where S1 is an area of drill 610 in a cross-section with drill axis O as a normal line, the cross-section including a boundary between the blade tip part and the trunk part (cross-section in line X-X in FIG. 16), r6 is a maximum value of a distance from drill axis O to an outer edge of drill 610 in the cross-section and S2 is an area of a circle R6 with r6 as a radius.

Comparison between FIG. 18 (Embodiment 5) and FIG. 21 (conventional drill) shows that the proportion of S1 to S2 in Embodiment 5 is smaller than that of the conventional drill. Therefore, in a case where respective drilled holes are the same in size, the drill of Embodiment 5 provides a larger gap between the drill and the drilled hole than that of the conventional drill and thus has enhanced chip evacuation performance. The drill prevents occurrence of a detect in the drill due to accumulation of chips in the gap and thus can have a long life.

Trunk part 62 can have a columnar shape including a bottom surface having a shape of drill 610 (shape surrounded by a pair of parallel lines and a pair of arcs) in the cross-section with drill axis O as a normal line, the cross-section including the boundary between the blade tip part and the trunk part (cross-section along line X-X in FIG. 16). The columnar shape is a shape resulting from a side surface of a circular column being cut off along a pair of parallel planes in a direction perpendicular to the bottom surface.

Examples

The present embodiments will more specifically be described using examples. However, the present embodiments are not limited by these examples.

[Samples 1 to 8]

As drills of samples 1 to 8, drills each having a configuration that is similar to that of Embodiment 1 and including a blade tip part and a trunk part each formed of polycrystalline diamond (a tool size is φ0.5 mm and a trunk part length is 0.5 mm) were fabricated.

Figure 22:
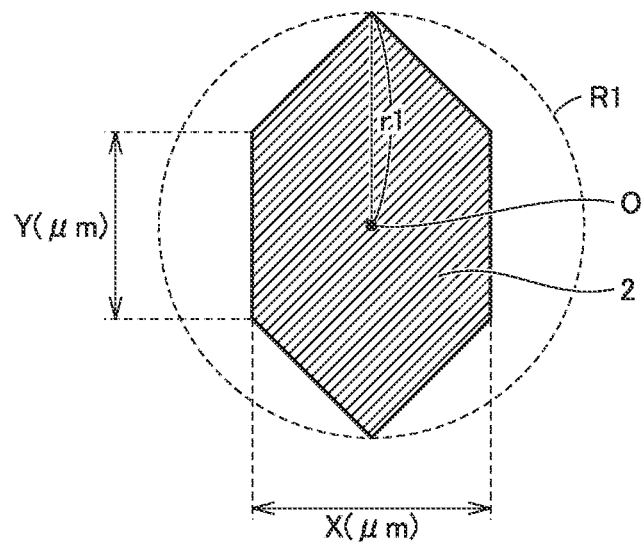
FIG. 22 is a diagram for describing a drill fabricated in examples.

FIG. 22 is a diagram illustrating a cross-sectional shape of drills of samples 1 to 8 in a cross-section with a drill axis O as a normal line, the cross-section including a boundary between a blade tip part and a trunk part. Lengths of X and Y, which are indicated in FIG. 22, in each of the drills of samples 1 to 8 are indicated in the "X (μm)" and "Y (μm)" columns of Table 1, respectively. Furthermore, based on the lengths of X and Y, a proportion of an area S1 of each drill in the cross-section to an area S2 of a circle R1 with r1 as a radius was calculated. The obtained values are indicated in the "S1/S2 (%)" column of Table 1.

[Sample 9]

As a drill of sample 9, a drill having a configuration that is similar to that in FIG. 19 and including a blade tip part and a trunk part each formed of polycrystalline diamond (a tool size is φ0.5 mm and a trunk part length is 0.5 mm) was fabricated. A cross-sectional shape of the drill in FIG. 19 is as illustrated in FIG. 21, and a length of each diagonal line (length indicated by r8×2 in FIG. 21) is 500 μm.

[Evaluation]

Using the drills of samples 1 to 9, drilling was performed under the following cutting conditions. Chip evacuation performance and the number of drilled holes in the drilling were evaluated.

<Cutting Conditions>
Work material: silicon with a thickness of 6.5 mm
Hole depth: 6 mm
Spindle rotation speed: n=30000/min
Feed speed: Vf=100 mm/min
Step=0.04 mm
Wet drilling <Evaluation Items>
(Chip Evacuation Performance)
A: Chips were evacuated without being stuck in flutes.
B: Chips were stuck in flutes.
Results are indicated in the "chip evacuation performance" column of Table 1.

(Number of Holes that can be Drilled)

After drilling each 10 holes, whether or not chipping occurs in cutting edges was observed. The number of drilled holes until occurrence of chipping in cutting edges was measured. Results are indicated in the "number of holes that can be drilled" column of Table 1.

TABLE 1

| Sample No. | S1/S2 (%) | X (μm) | Y (μm) | Chip evacuation performance | Number of holes that can be drilled |
|---|---|---|---|---|---|
| 1 | 10 | 50 | 390 | — | 0 |
| 2 | 20 | 100 | 370 | A | 100 |
| 3 | 30 | 160 | 330 | A | 1000 |
| 4 | 40 | 200 | 300 | A | 1500 |
| 5 | 45 | 240 | 260 | A | 2500 |
| 6 | 50 | 280 | 220 | A | 3000 |
| 7 | 55 | 340 | 150 | A | 2800 |
| 8 | 60 | 430 | 65 | A | 1500 |
| 9 | 65 | 500 | 0 | B | 10 |

[Consideration]

The drills of samples 3 to 8 each include four cutting edges and have a proportion of S1 to S2 (S1/S2) that is no less than 30% and no more than 60% and thus fall under the examples. The drills of samples 3 to 8 each have good chip evacuation performance and a drilled hole count of no less than 1000 and thus have a long life.

Each of the drills of samples 1 and 2 has a proportion of S1 to S2 (S1/S2) that is less than 30% and thus falls under comparative examples. The drill of sample 1 drilled no holes because of chipping of cutting edges at the start of drilling. The drill of sample 2 has good chip evacuation performance but a drilled hole count of 100 and thus has a life that is shorter than those of the examples.

The drill of sample 9 has a proportion of S1 to S2 (S1/S2) that exceeds 60% and falls under the comparative examples. The drill of sample 9 has poor chip evacuation performance and a drilled hole count of only 10 and thus has a short life.

Although embodiments and examples of the present disclosure have been described above, it is originally contemplated that the configurations of the embodiments and examples described above are appropriately combined or altered in various manners.

The presently disclosed embodiments and example are to be considered in all respects only as illustrative and not restrictive. The scope of the present invention is, therefore, indicated by the claims rather than by the above-described embodiments and examples, and all changes that come within the meaning and range of equivalency of the claims are to be embraced within the scope.

REFERENCE SIGNS LIST 1, 21, 31, 41, 51, 61, 71, 81 blade tip part, 2, 22, 32, 42, 52, 62, 72, 82 trunk part, 3, 23, 33, 43, 53, 63, 73, 83 body part, 4 connection part, 10, 210, 310, 410, 510, 610, 710, 810 drill, T apex, 5a, 5b, 5c, 5d, 25a, 25b, 25c, 25d, 25d, 25e, 25f, 25g, 25h, 35a, 35b, 35c, 35d, 45a, 45b, 45c, 45d, 55a, 55b, 55c, 55d, 65a, 65b, 65c, 65d cutting edge

The invention claimed is:

1. A drill comprising a blade tip part that is formed of diamond and a trunk part that is formed of diamond and is continuous with the blade tip part, the drill rotating about a drill axis, wherein:
the blade tip part includes N cutting edges where N is an integer of no less than 4;
each of the N cutting edges includes a corresponding one of N ridges leading to an apex of an N-sided pyramid having N surfaces, the apex being present on the drill axis, wherein the N ridges extend from the apex to a base of the pyramid, the N cutting edges extend from the apex to at least the base of the pyramid, each of the N cutting edges includes the corresponding one of the N ridges such that each of the N ridges coincides respectively with the N cutting edges over at least a portion of the length of the N cutting edges, each of the N ridges forms the portion of a respective cutting edge of the N cutting edges, the blade tip part includes the N surfaces of the N-sided pyramid;
the N cutting edges are configured such that at least two of the N cutting edges is different in length from the rest of the N cutting edges;
a proportion of S1 to S2 is no less than 30% and no more than 60%, where S1 is an area of the drill in a cross-section normal to the drill axis, the cross-section including a boundary between the blade tip part and the trunk part, r is a maximum value of a distance from the drill axis to an outer edge of the drill in the cross-section and S2 is an area of a circle with r as a radius;
the base of the pyramid defined, in a plane perpendicular to the drill axis, by imaginary straight lines connecting each of the N ridges, respectively, the base of the pyramid having a line-symmetric shape; and
in the cross-section, the drill has a line-symmetric shape.

2. The drill according to claim 1, wherein the proportion of S1 to S2 is no less than 45% and no more than 55%.

3. The drill according to claim 1, wherein the diamond is polycrystalline diamond having an average grain diameter of no more than 100 nm and a purity of no less than 99%.

4. The drill according to claim 1, wherein the diamond is single crystal diamond.

* * * * *